UNITED STATES PATENT OFFICE 2,269,498

AMINES OF FOURTH GROUP METAL HALIDES

Eugene Wainer, Niagara Falls, N. Y., assignor to The Titanium Alloy Manufacturing Company, New York, N. Y., a corporation of Maine No Drawing. Application May 11, 1939, Serial No. 273,058

7 Claims. (Cl. 260—429)

This invention relates to novel organo-metallic compounds and the method of making the same.

The novel compounds of the present invention comprise organic amines of metals of the fourth group of the periodic system. They may be represented by the general formula: $(AmX)_4M$, wherein Am represents an organic amine, X a halogen, and M a metal of the fourth group of the periodic table. In its preferred form this compound associates with additional molecules of the amine to form a compound of the formula $(AmX)_4M(Am)_4$, in which the second four amine molecules are united with the fourth group metal by covalent linkages. For convenience and clarity, chlorine will hereafter be taken as typical of and representative of the halogens, since it is commercially the most practicable. Bromine or iodine, however, may be substituted in its place.

These compounds are in the nature of salts, and are very easily hydrolyzed in the presence of moisture according to the following general reaction:

$$(AmCl)_4M + 4HOH \rightarrow 4AmHCl + M(OH)_4$$

They must therefore be formed and kept in an anhydrous medium, such as an anhydrous solvent.

Suitable solvents are: anhydrous methyl, ethyl, butyl or propyl alcohols, commercially obtainable in a sufficiently anhydrous condition to be directly usable. Such alcohols usually contain over 99.8% alcohol and only minute traces of acid and water. Although more anhydrous alcohols may be prepared, such as by refluxing and distillation over quick lime, it is not necessary that materials more anhydrous than those commercially obtainable be used, and because of their expense it is not desired to use them. Other solvents that may be employed are: benzene, toluene, ether, ethyl acetate, chloroform and butyl acetate. The solvent medium in fact can be any organic liquid which can be prepared in anhydrous form, which does not react with the ingredients, and in which the reactants and final compounds have suitable solubility characteristics. These solvents are used both as a medium for carrying out the reaction and for storing the resulting compounds until they are ready to be used.

The amines which can be used in the practice of this invention can be primary, secondary or tertiary, either alkyl or aryl, the latter containing the amino nitrogen either as a member of a ring or directly attached to an aryl ring as a side chain. Examples of alkyl amines are: ethyl amine, propyl amine and its substituted products, butyl amine and its substituted products, N-methyl propylamine, and similar compounds. Suitable alicyclic aryl amines are: aniline, diethyl aniline, dimethyl aniline, toluidine, xylidine, N-benzyl aniline, and the substituted products of these amines. Suitable heterocyclic aryl amines are pyridine and its substituted products. Certain of these amines produce colored products, which renders them unsatisfactory for certain purposes. Other amines are slightly colored or colorless.

The fourth group elements which can be employed are preferably titanium or zirconium since the products formed from these elements are commercially the most practicable. However, analogous compounds of silicon, germanium, tin, hafnium and thorium can be used.

These compounds are prepared by adding commercially pure anhydrous chlorides of the particular metal desired to a suitable quantity of pure anhydrous solvent. The proper amount of a pure liquid organic amine is then added slowly with stirring and the solution heated until all precipitated materials redissolve. The first part of the reaction proceeds in four stages as follows:

$$MCl_4 + Am \rightarrow AmCl \cdot MCl_3$$
$$AmCl \cdot MCl_3 + Am \rightarrow (AmCl)_2 \cdot MCl_2$$
$$(AmCl)_2 \cdot MCl_2 + Am \rightarrow (AmCl)_3 \cdot MCl$$
$$(AmCl)_3 \cdot MCl + Am \rightarrow (AmCl)_4 \cdot M$$

The first three stages in this reaction result in the formation of essentially acid materials which are of little utility commercially. Furthermore these materials are extremely sensitive to impurities and traces of moisture to such an extent that they are difficult to handle commercially, and, lastly, they tend to decompose spontaneously while standing on the shelf in closed containers. The last stage results in the formation of an essentially neutral compound.

While the compound formed by the last stage is useful for some purposes, it is rather sensitive to traces of impurities and moisture and tends to decompose spontaneously on long standing. In accordance with this invention, it has been found that by further reacting the compound thus formed with four additional molecules of the organic amine a compound is formed which is stable over long periods of time and is much less sensitive to small amounts of acids or moisture. The reaction which proceeds is exemplified as follows:

$$(AmCl)_4M + 4Am \rightarrow (AmCl)_4M \cdot (Am)_4$$

the second four molecules of the amine being bound to the metallo-organic compound by association or covalency according to the postulates of Sidgwick and Werner.

Having thus generally described the invention the following examples are now given:

*Example 1*

In a dry atmosphere, 476 grams of clear titanium tetrachloride liquor is slowly added to 1400 grams of commercially pure anhydrous methyl alcohol. The reaction vessel is cooled, during the mixture of the reactants, with running water. Then 1584 grams of pure pyridine is slowly added. After the addition of the pyridine is complete, the solution is heated to boiling and the alcohol allowed to reflux for about one hour; the solution is then cooled. The final product is a clear pale yellow solution free of suspended matter and remains stable for an indefinite period in properly sealed containers. The solution is essentially $$(C_5H_5NCl)_4Ti(C_5H_5N)_4$$

dissolved in anhydrous methyl alcohol. It contains the equivalent of 5.40% $TiO_2$ by weight.

*Example 2*

The same procedure is followed as in Example 1 except that 2424 grams of dimethylaniline is added to the first reaction mixture in place of the pyridine. The stable solution is a clear pale yellow color consisting essentially of $$(C_6H_5N(CH_3)_2Cl)_4Ti(C_6H_5N(CH_3)_2)_4$$

in anhydrous methyl alcohol. The solution contains the equivalent of 4.45% $TiO_2$ by weight.

*Example 3*

The same procedure is followed as in Example 1 except that 2980 grams of diethyl aniline is added to the first reaction mixture in place of the pyridine. A clear pale yellow brown solution, stable for protracted periods, results. It consists essentially of $$(C_6H_5N(C_2H_5)_2Cl)_4Ti(C_6H_5N(C_2H_5)_2)_4$$

in anhydrous methyl alcohol. The solution contains the equivalent of 4.35% $TiO_2$ by weight.

*Example 4*

The same procedure is followed as in Example 1 except that 1861 grams of aniline is added to the first reaction mixture in place of the pyridine. The result is a clear but dark colored solution sensitive to light. This should be stored in opaque containers.

*Example 5*

The same procedure is followed as in Example 1 except that 2142 grams of toluidine is added to the first reaction mixture in place of the pyridine. The result is a clear but dark colored solution sensitive to light. This should be stored in opaque containers.

*Example 6*

The same procedure is followed as in Example 1 except that 2422 grams of xylidine is added to the first reaction mixture in place of the pyridine. The result is a clear but dark colored solution sensitive to light. This should be stored in opaque containers.

*Example 7*

The same procedure is followed as in Example 1 except that 1162 grams of normal propylamine is added to the first reaction mixture in place of the pyridine. The result is a practically water white completely stable solution consisting essentially of $$(CH_3(CH_2)_2NH_2Cl)_4Ti(CH_3(CH_2)_2NH_2)_4$$

in anhydrous methyl alcohol solution.

*Example 8*

In a dry atmosphere 1400 grams of commercially pure dry benzene is mixed with 2424 grams of dry dimethylaniline. To this continually water cooled and rapidly stirred mixture of liquids is slowly added 476 grams of clear titanium tetrachloride liquor, keeping the temperature below 20° C. until all the $TiCl_4$ has been added. The liquor is then heated to boiling and refluxed for about one hour. It is then allowed to cool. If any crystals deposit on cooling, the clear liquor is decanted off and stored. The crystalline residue is brought into solution by the addition of small quantities of warm benzene. The resulting solution either may be added to the major liquor or used in such condition. Any amine which has a high solubility in benzene may be used as a starting reagent in the preparation of these metallo-compounds if they are to be used in benzene solution.

*Example 9*

Proceed in accordance with any of the above examples except that 586 grams of pure dry zirconium tetrachloride is used in place of the titanium tetrachloride. In using zirconium tetrachloride as a starting material, care must be taken to insure that this chemical is dry and unhydrolyzed before using. This is normally accomplished by redistilling the zirconium tetrachloride just prior to the addition in the starting reaction above. The tetrachloride is then transferred to the reaction vessel directly from the distillate flask so as to avoid undue contact with moist air. Another procedure which is also feasible is to distill the zirconium tetrachloride directly into the reaction vessel.

The compounds of the present invention are superior to the hydrolyzable compounds described in United States Letters Patent Nos. 1,906,148 and 1,906,149. The purity of the initial reactants need not be nearly so high. There are no by-products formed which need to be removed. Large amounts of heat are not evolved in the formation of the compounds, which renders them practical and easy to make on a commercial scale. Finally, the ultimate compounds are not so sensitive to slight traces of moisture, acids, or other impurities, or to short exposures to moist air, and at the same time are sufficiently sensitive to be useful as hydrolyzable compounds when exposed for longer periods to the atmosphere.

These compounds are admirably suited for use in paints, varnishes, lacquers, films, fibers, etc. They may act as delustering or flatting agents in such vehicles. For certain lacquers and varnishes they have a pronounced effect in increasing the bond or adhesion of such lacquers and varnishes to metallic surfaces. They also increase the weathering and corrosion resistance of such lacquers and varnishes. For any of these purposes, from 0.5% to 10% by volume of solutions prepared by the above examples may be used, the amount varying with the effect which it is desired to produce. For the flatting of resin base varnishes and lacquers from 1% to 2% is most suitable. After mixing, application to the surface to be treated, and continued exposure to atmospheric air, a flatted or hand rubbed appearance is produced. For increasing bond strength of lacquer films to metallic surfaces from 2% to 5% is most suitable, although quantities as high as 10% may be used.

In addition to the use of these compounds as delustering and flatting agents they can be used as starting means for the preparation of gels, catalysts, catlyst supports, and gas adsorbent materials. When a small amount of water is added to anhydrous solvents containing the materials of the present invention in solution, the mass quickly sets up to form a firm gel. When heated to elevated temperatures, organic materials are driven off, leaving behind a highly porous structure useful as a catalyst or catalyst support or a gas adsorbent mass.

An example of the preparation of such a gel is as follows: To 100 cc. of 95% ethyl alcohol (i. e., containing 5% water) is added 10 cc. of any of the compositions prepared in accordance with the above examples. It is mixed well and allowed to stand. In 10 to 20 minutes the hydration of the metallo-organic compound will have proceeded to such an extent that the mixture is completely solid as a firm jelly of titanium hydrate.

As many modifications may be made within the spirit of this invention it is not intended to be limited except as defined in the appended claims.

I claim:

1. As a new composition of matter, a compound having the formula $(AmX)_4M(Am)_4$, where Am represents an organic amine, X a halogen, and M a metal of the fourth group of the periodic system.

2. As a new composition of matter, a compound having the formula $(AmCl)_4Ti(Am)_4$, where Am represents an organic amine.

3. As a new composition of matter, a compound having the formula $(AmCl)_4Zr(Am)_4$, where Am represents an organic amine.

4. As a new composition of matter, a compound having the formula $(AmX)_4M(Am)_4$, where Am represents an organic amine, X a halogen, and M a metal of the fourth group of the periodic system, said compound being dissolved in an anhydrous solvent.

5. As a new composition of matter, a compound having the formula $(AmCl)_4Ti(Am)_4$, where Am represents an organic amine, said compound being dissolved in an anhydrous solvent.

6. As a new composition of matter, a compound having the formula $(AmCl)_4Zr(Am)_4$, where Am represents an organic amine, said compound being dissolved in an anhydrous solvent.

7. The method comprising reacting one mol of anhydrous zirconium chloride with eight mols of an anhydrous amine in an anhydrous solvent.

EUGENE WAINER.